(12) United States Patent
Kim et al.

(10) Patent No.: US 12,230,848 B2
(45) Date of Patent: Feb. 18, 2025

(54) AIR CONTROL VALVE FOR FUEL CELL

(71) Applicants: HYUNDAI MOTOR COMPANY, Seoul (KR); Kia Corporation, Seoul (KR)

(72) Inventors: Sang Woo Kim, Chuncheon-si (KR); Ju Yong Lee, Suwon-si (KR); Byeong seung Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 447 days.

(21) Appl. No.: 17/837,552

(22) Filed: Jun. 10, 2022

(65) Prior Publication Data

US 2023/0024605 A1    Jan. 26, 2023

(30) Foreign Application Priority Data

Jul. 22, 2021    (KR) .................. 10-2021-0096663

(51) Int. Cl.
*H01M 8/04089*    (2016.01)
*H01M 8/0273*    (2016.01)
*H01M 8/04119*    (2016.01)
*H01M 8/04223*    (2016.01)
*H01M 8/2485*    (2016.01)

(52) U.S. Cl.
CPC ..... *H01M 8/04253* (2013.01); *H01M 8/0273* (2013.01); *H01M 8/04089* (2013.01); *H01M 8/04179* (2013.01); *H01M 8/04231* (2013.01); *H01M 8/2485* (2013.01); *H01M 2250/20* (2013.01)

(58) Field of Classification Search
CPC ......... H01M 8/04089; H01M 8/04179; H01M 8/04231; H01M 8/04253; H01M 8/2485
See application file for complete search history.

(56) References Cited

U.S. PATENT DOCUMENTS 10,658,687 B2 *    5/2020  Park ................. H01M 8/04231
2020/0212460 A1 *    7/2020  Lee ...................... F16K 1/2021

FOREIGN PATENT DOCUMENTS

KR    1020210031283 A  *  3/2021  ............ B60L 3/0053

* cited by examiner

*Primary Examiner* — Kevin E Yoon
(74) *Attorney, Agent, or Firm* — MORGAN, LEWIS & BOCKIUS LLP

(57) ABSTRACT

An air control valve apparatus for a fuel cell, which controls air that flows into or out of a fuel cell stack, includes a valve housing having an air flow path fluidically-communicating with the fuel cell stack; a valve member configured to selectively open or close the air flow path; a trapping portion provided in the valve housing, disposed adjacent to an internal surface of the valve member, and configured to trap foreign substances discharged from the fuel cell stack; and a siphon guide tube connected between the trapping portion and the outside of the valve member and configured to selectively discharge the foreign substances trapped by the trapping portion to the outside of the valve member, improving stability and reliability.

20 Claims, 10 Drawing Sheets

AIR CONTROL VALVE FOR FUEL CELL

CROSS-REFERENCE TO RELATED APPLICATION

The present application claims priority to Korean Patent Application No. 10-2021-0096663 filed on Jul. 22, 2021, the entire contents of which is incorporated herein for all purposes by this reference.

BACKGROUND OF THE INVENTION

Field of the Invention

The present invention relates to an air control valve apparatus for a fuel cell, and more particularly, to an air control valve apparatus for a fuel cell, which is capable of minimizing accumulation of foreign substances and improving stability and reliability.

Description of Related Art

A fuel cell system refers to a system that continuously produces electrical energy by a chemical reaction of continuously supplied fuel. Research and development are consistently performed on the fuel cell system as an alternative capable of solving global environmental issues.

Based on types of electrolytes used for the fuel cell system, the fuel cell system may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), a direct methanol fuel cell (DMFC), and the like. Based on operating temperatures, output ranges, and the like as well as types of used fuel, the fuel cell systems may be applied to various application fields related to mobile power, transportation, distributed power generation, and the like.

Among the fuel cells, the polymer electrolyte membrane fuel cell is applied to the field of a hydrogen vehicle (hydrogen fuel cell vehicle) being developed to substitute for an internal combustion engine.

The hydrogen vehicle includes a fuel cell stack that produces electricity through an oxidation-reduction reaction between hydrogen and oxygen. The hydrogen vehicle is configured to travel as a motor is operated by electricity produced by the fuel cell stack.

Meanwhile, the hydrogen vehicle is provided with an air control valve configured to control air to be introduced into the fuel cell stack and to control air discharged from the fuel cell stack.

A valve member (valve disc) of the air control valve operates to open an air flow path while the vehicle operates, and the valve member operates to close the air flow path when the vehicle does not operate.

Meanwhile, if foreign substances (e.g., condensate water and corroded substances in the fuel cell stack) are accumulated at the periphery of the valve member in the air control valve, the performance in opening or closing the valve member and the performance in sealing the valve member deteriorate.

Because the foreign substances accumulated at the periphery of the valve member are frozen in the winter season when an atmospheric temperature is low, the valve member is difficult to normally open or close.

Therefore, recently, various studies have been conducted to minimize the accumulation of foreign substances at the periphery of the valve member and ensure a smooth operation of the valve member, but the study results are still insufficient. Accordingly, there is a need to develop a technology to minimize the accumulation of foreign substances and ensure the smooth operation of the valve member.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air control valve apparatus for a fuel cell, which is capable of minimizing accumulation of foreign substances at the periphery of a valve member and improving stability and reliability.

The present invention has been made in an effort to minimize accumulation of foreign substances at the periphery of a valve member and minimize disability of the valve member caused by frozen foreign substances.

The present invention, in various aspects thereof, has also been made in an effort to improve performance in opening or closing a valve member and performance in sealing the valve member.

The objects to be achieved by the embodiments are not limited to the above-mentioned objects, but also include objects or effects which may be understood from the solutions or embodiments described below.

Various aspects of the present invention provide an air control valve apparatus for a fuel cell, which controls air that flows into or out of a fuel cell stack, the air control valve apparatus including: a valve housing having an air flow path fluidically-communicating with the fuel cell stack; a valve member movably mounted to the valve housing and configured to selectively open or close the air flow path; a trapping portion provided in the valve housing, disposed adjacent to an internal surface of the valve member, and configured to trap foreign substances discharged from the fuel cell stack; and a siphon guide tube connected between the trapping portion and the outside of the valve member and configured to selectively discharge the foreign substances trapped by the trapping portion to the outside of the valve member through the siphon guide tube.

This is to improve safety and reliability of the air control valve apparatus for a fuel cell.

That is, if foreign substances (e.g., condensate water and corroded substances in the fuel cell stack) are accumulated at the periphery of the valve member in the air control valve, the performance in opening or closing the valve member and the performance in sealing the valve member deteriorate. Because the foreign substances accumulated at the periphery of the valve member are frozen in the winter season when an atmospheric temperature is low, the valve member is difficult to operate normally (open or close).

However, according to the exemplary embodiment of the present invention, the foreign substances at the periphery of the valve member may be trapped by the trapping portion and then discharged to the outside of the valve member through the siphon guide tube. Therefore, it is possible to obtain an advantageous effect of minimizing the accumulation of foreign substances and the frozen foreign substances at the periphery of the valve member and improving operational stability and sealability of the valve member.

The trapping portion may have various structures configured for trapping the foreign substances in the air flow path.

For example, the trapping portion may include: a trapping hole provided in the valve housing and disposed adjacent to the internal surface of the valve member; and a trapping wall disposed between the valve member and the trapping hole to guide the foreign substances to the trapping hole.

The trapping hole may have a cross-sectional area that gradually decreases from an inlet thereof toward an outlet thereof.

Since the cross-sectional area of the trapping hole gradually decreases from the inlet toward the outlet of the trapping hole as described above, the foreign substances trapped in the trapping hole may be naturally guided along a wall surface of the trapping hole to the siphon guide tube connected to the outlet of the trapping hole.

According to the exemplary embodiment of the present invention, the air control valve apparatus for a fuel cell may include an inclined guide portion provided on an internal surface of the trapping wall and configured to guide the foreign substances to the trapping hole.

Since the inclined guide portion is provided on the internal surface of the trapping wall as described above, the foreign substances attached to the internal surface of the trapping wall (or the foreign substances moved downwards along the internal surface of the valve member) may be naturally moved downwards along the inclined guide portion to the trapping hole. Therefore, it is possible to obtain an advantageous effect of further improving efficiency in trapping the foreign substances.

Furthermore, the air control valve apparatus for a fuel cell may include a seating portion provided on an external surface of the trapping wall, wherein the valve member is selectively seated on the seating portion.

The siphon guide tube may have various structures configured for moving (discharging) the foreign substances based on the siphon principle.

For example, the siphon guide tube may include: a trapping tube connected to an outlet of the trapping hole to receive the foreign substances therein; and a discharge tube having a first end portion connected to the trapping tube and a second end portion externally exposed of the valve member. The trapping tube may have a 'U'-shaped cross-section.

According to the exemplary embodiment of the present invention, an inlet of the trapping hole may have a first cross-sectional area, and an outlet of the siphon guide tube may have a second cross-sectional area smaller than the first cross-sectional area.

This is to inhibit a reverse flow of the foreign substances trapped in the trapping hole.

That is, when the air flow path is blocked by the valve member at the same time when the operation of the fuel cell stack is stopped, a negative pressure may be applied into the air flow path, and the internal pressure (negative pressure) in the air flow path may cause a reverse flow of the foreign substances trapped in the trapping hole.

However, according to the exemplary embodiment of the present invention, the cross-sectional area (the second cross-sectional area) of the outlet of the siphon guide tube may be smaller than the cross-sectional area (the first cross-sectional area) of the inlet of the trapping hole. Therefore, it is possible to obtain an advantageous effect of inhibiting a reverse flow of the foreign substances trapped in the trapping hole when the negative pressure is applied into the air flow path.

A ratio of the cross-sectional area (the first cross-sectional area) of the inlet of the trapping hole to the cross-sectional area (the second cross-sectional area) of the outlet of the siphon guide tube may be 5:4.

According to the exemplary embodiment of the present invention, the air control valve apparatus for a fuel cell may include a sealing portion configured to seal a gap between the air flow path and the valve member.

The sealing portion may have various structures configured for closing (sealing) the gap between the air flow path and the valve member.

For example, the sealing portion may include a first sealing member disposed on the internal surface of the valve member and configured to come into contact with the seating portion.

The sealing portion may include a second sealing member disposed on the valve member, spaced from the first sealing member, and configured to come into contact with the seating portion.

As described above, according to the exemplary embodiment of the present invention, the gap between the valve member and the seating portion (the gap between the air flow path and the valve member) may be sealed by the dual sealing structure including the first sealing member and the second sealing member, in the state in which the valve member is accommodated on the seating portion. Therefore, it is possible to obtain an advantageous effect of improving the sealing performance implemented by the valve member and minimizing the leakage of air through the gap between the valve member and the seating portion.

According to various exemplary embodiments of the present invention, the air control valve apparatus for a fuel cell may include the sealing portion configured to seal the gap between the air flow path and the valve member. The sealing portion may include the first sealing member disposed on the internal surface of the valve member and configured to come into contact with the seating portion, and the second sealing member disposed on the seating portion and configured to come into contact with the internal surface of the valve member.

For example, the second sealing member may be provided in a form of a closed loop and accommodated in the first sealing member.

Since the second sealing member provided in a form of a closed loop is disposed in the first sealing member as described above, the gap between the valve member and the seating portion may be sealed by the triple sealing structure. Therefore, it is possible to obtain an advantageous effect of further improving the sealing performance implemented by the valve member and more effectively inhibiting the leakage of air through the gap between the valve member and the seating portion.

According to the exemplary embodiment of the present invention, the air control valve apparatus for a fuel cell may include a through-hole provided in the trapping wall, one end portion of the through-hole may be exposed to an internal surface of the trapping wall, and the other end portion of the through-hole may be exposed to an external surface of the trapping wall.

As described above, since the through-hole is provided in the trapping wall, foreign substances accumulated between the valve member and the external surface of the trapping wall may be trapped in the trapping hole. Therefore, it is possible to obtain an advantageous effect of further improving the efficiency in trapping the foreign substances. Furthermore, it is possible to minimize the accumulation of the foreign substances between the valve member and the valve housing and effectively remove the foreign substances accumulated between the valve member and the valve housing.

The through-hole may be inclined downwardly from the external surface of the trapping wall toward the internal surface of the trapping wall.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
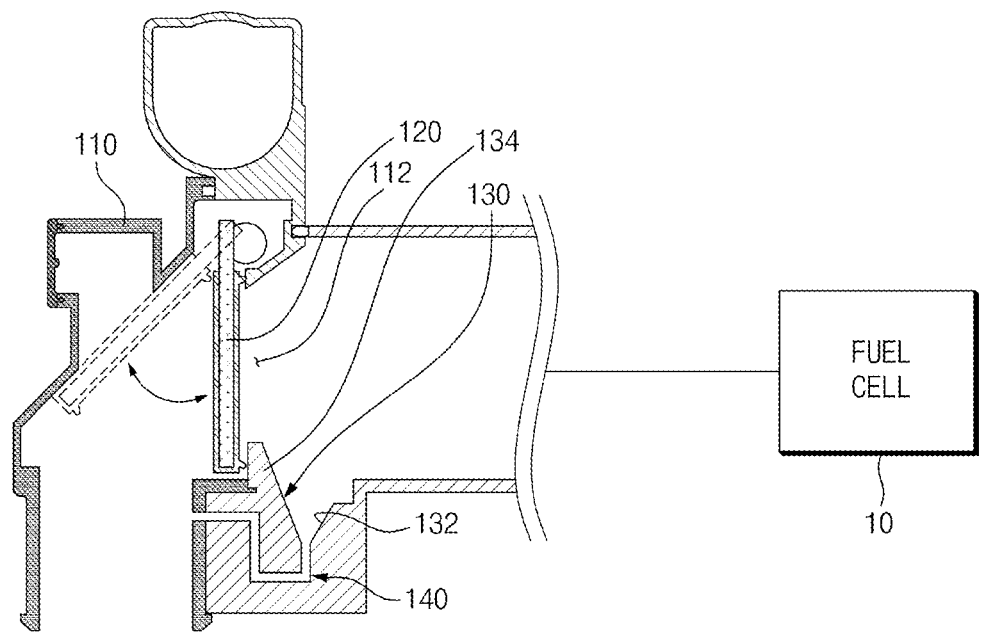
FIG. 1 is a view for explaining an air control valve for a fuel cell according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings.

However, the technical spirit of the present invention is not limited to various exemplary embodiments described herein but may be implemented in various different forms. One or more of the constituent elements in the exemplary embodiments may be selectively combined and substituted for use within the scope of the technical spirit of the present invention.

Furthermore, unless otherwise specifically and explicitly defined and stated, the terms (including technical and scientific terms) used in the exemplary embodiments of the present invention may be construed as the meaning which may be commonly understood by the person with ordinary skill in the art to which various exemplary embodiments of the present invention pertains. The meanings of the commonly used terms such as the terms defined in dictionaries may be interpreted in consideration of the contextual meanings of the related technology.

Furthermore, the terms used in the exemplary embodiments of the present invention are for explaining the embodiments, not for limiting the present invention.

In the exemplary embodiment, unless particularly stated otherwise, a singular form may also include a plural form. The expression "at least one (or one or more) of A, B, and C" may include one or more of all combinations that can be made by combining A, B, and C.

Furthermore, the terms such as first, second, A, B, (a), and (b) may be used to describe constituent elements of the exemplary embodiments of the present invention.

These terms are used only for discriminating one constituent element from another constituent element, and the nature, the sequences, or the orders of the constituent elements are not limited by the terms.

Furthermore, when one constituent element is referred to as being 'connected', 'coupled', or 'attached' to another constituent element, one constituent element may be connected, coupled, or attached directly to another constituent element or connected, coupled, or attached to another constituent element through yet another constituent element interposed therebetween.

Furthermore, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 10, an air control valve 100 according to the exemplary embodiment of the present invention includes a valve housing 110 having an air flow path 112 fluidically-communicating with a fuel cell stack 10, a valve member 120 configured to selectively open or close the air flow path 112, a trapping portion 130 provided in the valve housing 110, disposed adjacent to an internal surface of the valve member 120, and configured to trap foreign substances discharged from the fuel cell stack 10, and a siphon guide tube 140 connected to the trapping portion 130 and configured to selectively discharge the foreign substances trapped by the trapping portion 130 to the outside of the valve member 120.

The air control valve 100 according to the exemplary embodiment of the present invention may be used to control air to be introduced into the fuel cell stack 10 and to control air to be discharged from the fuel cell stack 10.

For reference, the air control valve 100 according to the exemplary embodiment of the present invention may be applied to various fuel cell vehicles (e.g., passenger vehicles or commercial vehicles), ships, mobility vehicles in aerospace fields, or the like to which the fuel cell stack 10 may be applied. The present invention is not restricted or limited by the types and properties of the subjects to which the air control valve 100 is applied.

The fuel cell stack 10 refers to a kind of power generation device that generates electrical energy through a chemical reaction of fuel (e.g., hydrogen). The fuel cell stack may be configured by stacking several tens or hundreds of fuel cells (unit cells) in series.

The fuel cell may have various structures configured for producing electricity by an oxidation-reduction reaction between fuel (e.g., hydrogen) and an oxidant (e.g., air).

For example, the fuel cell may include: a membrane electrode assembly (MEA) having catalyst electrode layers in which electrochemical reactions occur and which is attached to two opposite sides of an electrolyte membrane through which hydrogen ions move; a gas diffusion layer (GDL) configured to uniformly distribute reactant gases and transfer generated electrical energy; a gasket and a fastener configured to maintain leakproof sealability for the reactant gases and a coolant and maintain an appropriate fastening pressure; and a separator (bipolar plate) configured to move the reactant gases and the coolant.

In the fuel cell, hydrogen, which is fuel, and air (oxygen), which is an oxidant, are supplied to an anode and a cathode of the membrane electrode assembly, respectively, through flow paths in the separator such that the hydrogen is supplied to the anode, and the air is supplied to the cathode.

The hydrogen supplied to the anode is decomposed into hydrogen ions (protons) and electrons by catalysts in the electrode layers provided at two opposite sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons delivered through the separator meet oxygen in the air supplied to the cathode by an air supply device, generating a reaction of producing water. As a result of the movement of the hydrogen ions, the electrons flow through external conductive wires, and the electric current is generated as a result of the flow of the electrons.

The valve housing 110 has therein the air flow path 112 through which air flows. The valve housing 100 is mounted in the vehicle (fuel cell vehicle).

The valve housing 110 may be variously changed in shape and structure in accordance with required conditions and design specifications. The present invention is not restricted or limited by the shape and the structure of the valve housing 110.

The air flow path 112 includes a first flow path through which the air is supplied to the fuel cell stack 10, and a second flow path through which the air is discharged from the fuel cell stack 10. For example, in the valve housing 110, the first flow path and the second flow path may be individually separated (partitioned) by a partition wall.

Furthermore, the valve housing 110 is provided with a first port connected to an air inlet port of the fuel cell stack 10, and a second port connected to an air discharge port of the fuel cell stack 10.

For example, the first port may communicate with the first flow path, and the air to be supplied to the fuel cell stack 10 may flow through the first port. Furthermore, the second port may communicate with the second flow path, and the air discharged from the fuel cell stack 10 may flow through the second port.

Furthermore, the valve housing 110 may be provided with a bypass flow path configured to connect the first flow path and the second flow path and allow the air introduced into the first flow path to selectively flow to the second flow path.

The valve member 120 is configured to selectively open or close the air flow path 112 by being rotated by a drive unit (e.g., a motor or solenoid).

Hereinafter, an example will be described in which the valve member 120 opens or closes the air flow path 112 (e.g., the second flow path) through which the air is discharged from the fuel cell stack 10.

The valve member 120 may have various structures configured for opening or closing the air flow path 112. The present invention is not restricted or limited by the structure and shape of the valve member 120.

For example, the valve member 120 may have a shape corresponding to a cross-sectional shape (e.g., a quadrangular cross-sectional shape) of the air flow path 112. According to various exemplary embodiments of the present invention, the valve member may have a different shape from the air flow path.

Figure 2:
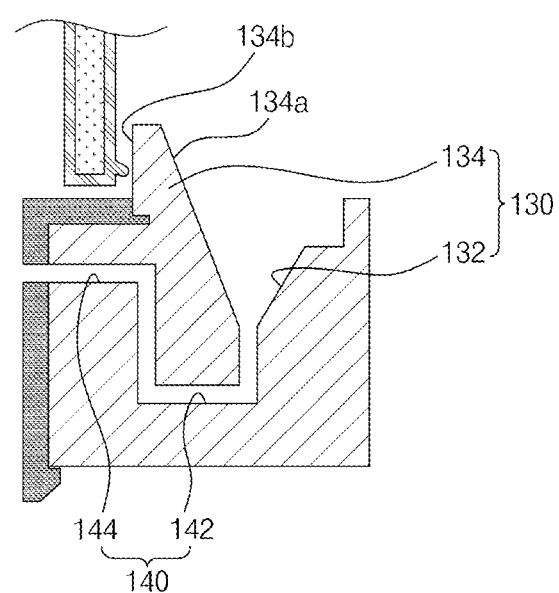
FIG. 2 is a view for explaining a trapping portion and a siphon guide tube of the air control valve for a fuel cell according to the exemplary embodiment of the present invention.

Referring to FIG. 2, the trapping portion 130 is provided in the valve housing 110 and disposed adjacent to the internal surface of the valve member 120 to trap foreign substances discharged from the fuel cell stack 10.

For reference, in the exemplary embodiment of the present invention, the foreign substances discharged from the fuel cell stack 10 may be defined as a concept including both condensate water made as moisture vapor discharged from the fuel cell stack 10 is condensed, and corroded substances in the fuel cell stack 10.

For example, when the operation of the fuel cell stack 10 is stopped, the valve member 120 closes the air flow path 112. When the operation of the fuel cell stack 10 is stopped (the air flow path is closed by the valve member) in a state in which an interior of the air flow path 112 is filled with moisture vapor (e.g., moisture vapor at 65° C. to 80° C.) discharged from the fuel cell stack 10, an internal temperature of the air flow path 112 is decreased such that the moisture vapor with which the interior of the air flow path 112 is filled is condensed, and the condensate water is generated.

If the foreign substances are accumulated in the air flow path 112 (particularly, the condensate water is accumulated at the periphery of the valve member), the valve member 120 is difficult to smoothly open or close. Therefore, it is necessary to minimize the accumulation of the foreign substances in the air flow path 112.

Accordingly, according to the exemplary embodiment of the present invention, the trapping portion 130 may be disposed adjacent to the internal surface of the valve member 120, and the foreign substances in the air flow path 112 may be trapped by the trapping portion 130. Therefore, it is possible to obtain an advantageous effect of minimizing the accumulation of the foreign substances, which affect the operation of opening or closing the valve member 120, at the periphery of the valve member 120.

The trapping portion 130 may have various structures configured for trapping the foreign substances in the air flow path 112. The present invention is not restricted or limited by the structure of the trapping portion 130.

For example, the trapping portion 130 may include a trapping hole 132 provided in the valve housing 110 and disposed adjacent to the internal surface of the valve member 120, and a trapping wall 134 disposed between the valve member 120 and the trapping hole 132.

The trapping hole 132 may be provided in a form of a recessed hole (or groove) having a trapping space configured for trapping the foreign substances. The trapping hole 132 may be provided in a bottom portion of the air flow path 112 and disposed maximally adjacent to the internal surface of the valve member 120.

The trapping hole 132 may be variously changed in structure and shape in accordance with required conditions and design specifications. The present invention is not restricted or limited by the structure and shape of the trapping hole 132.

For example, the trapping hole 132 may have an approximately circular shape. According to various exemplary embodiments of the present invention, the trapping hole may have a quadrangular shape or other shapes.

The trapping hole 132 may have a cross-sectional area that gradually decreases from an inlet (an upper end portion based on FIG. 2) thereof toward an outlet (a lower end portion based on FIG. 2) thereof.

Since the cross-sectional area of the trapping hole 132 gradually decreases from the inlet toward the outlet of the trapping hole 132 as described above, the foreign substances trapped in the trapping hole 132 may be naturally guided along a wall surface of the trapping hole 132 to the siphon guide tube 140 connected to the outlet of the trapping hole 132.

The trapping wall 134 is disposed between the valve member 120 and the trapping hole 132 and partially covers a lower end portion (based on FIG. 1) of the valve member 120.

Since the trapping wall 134 is disposed between the valve member 120 and the trapping hole 132 as described above, it is possible to obtain an advantageous effect of minimizing the introduction of the foreign substances to the lower end portion of the valve member 120.

The air control valve 100 for a fuel cell may include an inclined guide portion 134a provided on an internal surface of the trapping wall 134 (a right surface of the trapping wall based on FIG. 2) and configured to guide the foreign substances to the trapping hole 132.

Since the inclined guide portion 134a is provided on the internal surface of the trapping wall 134 as described above, the foreign substances attached to the internal surface of the trapping wall 134 (or the foreign substances moved downwards along the internal surface of the valve member) may be naturally moved downwards along the inclined guide portion 134a to the trapping hole 132. Therefore, it is possible to obtain an advantageous effect of further improving efficiency in trapping the foreign substances.

In an exemplary embodiment of the present invention, the inclined guide portion 134a may include a front inclined guide portion inclined downwardly from the trapping wall 134 toward the trapping hole 132 in a rearward direction, and a rear inclined guide portion inclined downwardly from the trapping wall 134 toward the trapping hole 134 in a forward direction, wherein a height of the rear inclined guide portion is lower than a height of the front inclined guide portion.

Furthermore, the air control valve 100 for a fuel cell may include a seating portion 134b provided on an external surface of the trapping wall 134 (a left surface of the trapping wall based on FIG. 2) and configured to allow the valve member 120 to be accommodated thereon.

The seating portion 134b may have various structures on which the valve member 120 may be accommodated. The present invention is not restricted or limited by the structure and shape of the seating portion 134b.

For example, the seating portion 134b may be provided in a form of a flat surface corresponding to an edge portion of the internal surface of the valve member 120. The edge portion of the internal surface of the valve member 120 may come into contact with the seating portion 134b, which makes it possible to more assuredly close the air flow path 112.

The siphon guide tube 140 is connected to the trapping portion 130 and selectively discharges the foreign substances, trapped by the trapping portion 130, to the outside of the valve member 120.

One end portion (an inlet end) of the siphon guide tube 140 may be connected to the outlet of the trapping hole 132, and the other end portion (an outlet end) of the siphon guide tube 140 may be externally exposed of the valve member 120 (e.g., a space at a side of an external surface of the valve member). The foreign substances trapped in the trapping hole 132 may be discharged to the outside of the valve member 120 along the siphon guide tube 140 based on the siphon principle.

The siphon guide tube 140 may have various structures configured for moving (discharging) the foreign substances (e.g., condensate water) based on the siphon principle. The present invention is not restricted or limited by the structure of the siphon guide tube 140.

For example, the siphon guide tube 140 may include a trapping tube 142 connected to the outlet of the trapping hole 132 and filled with the foreign substances, and a discharge tube 144 having one end portion connected to the trapping tube 142 and the other end portion externally exposed of the valve member 120.

Hereinafter, an example will be described in which the trapping tube 142 has an approximately 'U'-shaped cross-section and is connected to the outlet of the trapping hole 132, and the discharge tube 144 has a straight shape in a horizontal direction and is connected to the outlet end portion of the trapping tube 142.

According to various exemplary embodiments of the present invention, the trapping tube may have an 'S' shape, a 'W' shape, or other shapes, and the discharge tube may have a curved shape or other shapes.

Figure 3:
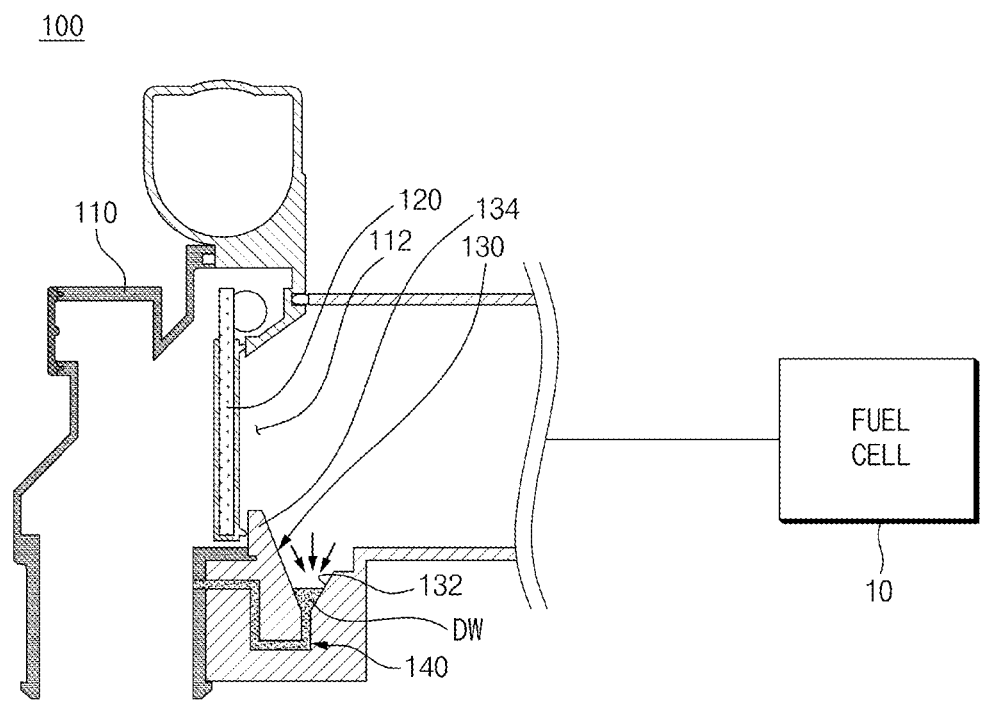
FIG. 3 is a view for explaining a state in which foreign substances are trapped in the air control valve for a fuel cell according to the exemplary embodiment of the present invention.
Figure 4:
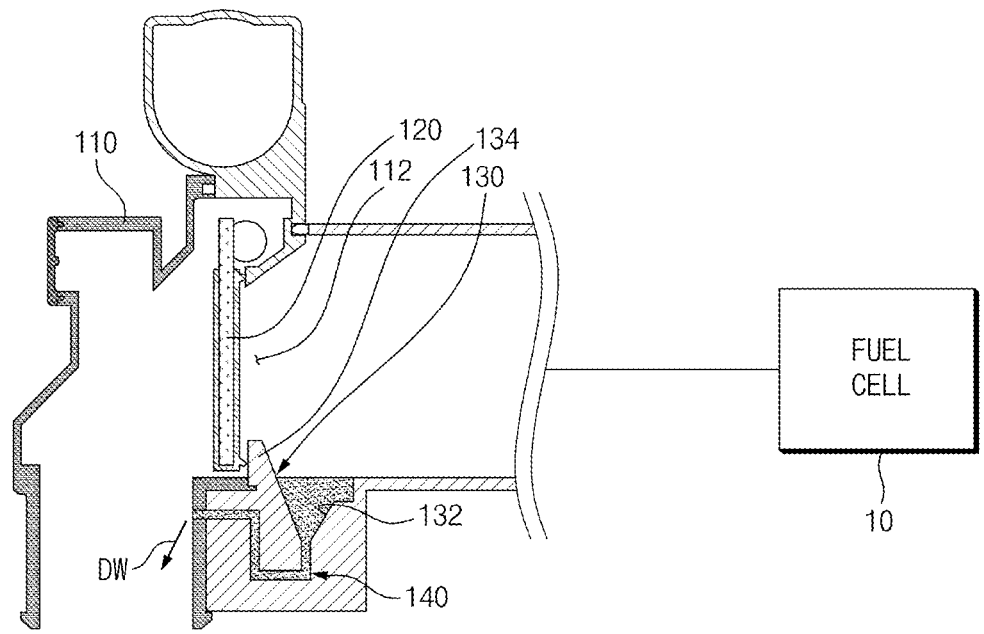
FIG. 4 is a view for explaining a state in which foreign substances are discharged from the air control valve for a fuel cell according to the exemplary embodiment of the present invention.

Referring to FIG. 3, foreign substances DW in the air flow path 112 may be trapped in the trapping hole 132. When a level of the foreign substances DW trapped in the trapping hole 132 is increased to a predetermined level or higher, the foreign substances DW accommodated in the trapping hole 132 may be discharged to the outside of the valve member 120 along the siphon guide tube 140, as illustrated in FIG. 4.

The siphon guide tube 140 may continuously discharge the foreign substances DW until the level of the foreign substances DW in the trapping hole 132 becomes lower than a height of the outlet end portion of the discharge tube 144. When the level of the foreign substances DW in the trapping hole 132 becomes lower than the height of the outlet end portion of the discharge tube 144, the discharge of the foreign substances DW may be stopped.

Furthermore, since the interior of the siphon guide tube 140 is filled with the foreign substances DW, a flow of air through the siphon guide tube 140 may be blocked in the state in which the discharge of the foreign substances DW is stopped.

In other words, when the amount of foreign substances DW accumulated in the air flow path 112 (in the valve member) is increased to a predetermined degree or more (the level of the foreign substances trapped in the trapping hole is increased to a predetermined level or higher), the foreign substances may be discharged to the outside of the valve member 120 through the siphon guide tube 140. In contrast, since the siphon guide tube 140 may be blocked by the foreign substances DW (see FIG. 3) in the state in which the discharge of the foreign substances DW is stopped, the state in which the valve member 120 closes the air flow path 112 (blocks the introduction of air into the air flow path) may be maintained.

In an exemplary embodiment of the present invention, the discharge tube 144 is positioned higher than the outlet of the trapping hole 132.

Meanwhile, according to the exemplary embodiment of the present invention, the inlet of the trapping hole 132 has a first cross-sectional area, and the outlet of the siphon guide tube 140 has a second cross-sectional area smaller than the first cross-sectional area.

This is to inhibit a reverse flow of the foreign substances trapped in the trapping hole 132.

That is, when the air flow path 112 is closed by the valve member 120 at the same time when the operation of the fuel cell stack 10 is stopped, a negative pressure may be applied into the air flow path 112, and the internal pressure (negative pressure) in the air flow path 112 may cause a reverse flow of the foreign substances trapped in the trapping hole 132.

However, according to the exemplary embodiment of the present invention, the cross-sectional area (the second cross-sectional area) of the outlet of the siphon guide tube 140 may be smaller than the cross-sectional area (the first cross-sectional area) of the inlet of the trapping hole 132. Therefore, it is possible to obtain an advantageous effect of inhibiting a reverse flow of the foreign substances trapped in the trapping hole 132 when the negative pressure is applied into the air flow path 112.

A ratio of a cross-sectional area (the first cross-sectional area) A1 of the inlet of the trapping hole 132 to a cross-sectional area (the second cross-sectional area) A2 of the outlet of the siphon guide tube 140 may be 5:4.

For example, when the air flow path 112 is closed by the valve member 120 at the same time when the operation of the fuel cell stack 10 is stopped, an external pressure P2 of the valve member 120 may be about 100 kPa (the atmospheric pressure), and a pressure in the air flow path 112 (an internal pressure of the valve member 120) P1 may be about 80 kPa.

Therefore, it is possible to implement the equilibrium between a force applied to the inlet of the trapping hole 132 and a force applied to the outlet of the siphon guide tube 140 by setting the ratio of the cross-sectional area (the first cross-sectional area) A1 of the inlet of the trapping hole 132 to the cross-sectional area (the second cross-sectional area) A2 of the outlet of the siphon guide tube 140 to 5:4 (100:80), on the contrary to the ratio (80:100, i.e., 4:5) of the pressure P1 applied to the inlet of the trapping hole 132 to the pressure P2 applied to the outlet of the siphon guide tube 140. Therefore, even though the negative pressure is applied into the air flow path 112, it is possible to inhibit the foreign substances trapped in the trapping hole 132 from flowing reversely into the air flow path 112.

Referring to FIG. 5, FIG. 6, FIG. 7, FIG. 8, and FIG. 9, according to the exemplary embodiment of the present invention, the air control valve 100 for a fuel cell may include a sealing portion 150 configured to seal a gap between the air flow path 112 and the valve member 120.

The sealing portion 150 may have various structures configured for closing (sealing) the gap between the air flow path 112 and the valve member 120. The present invention is not restricted or limited by the structure of the sealing portion 150.

Figure 5:
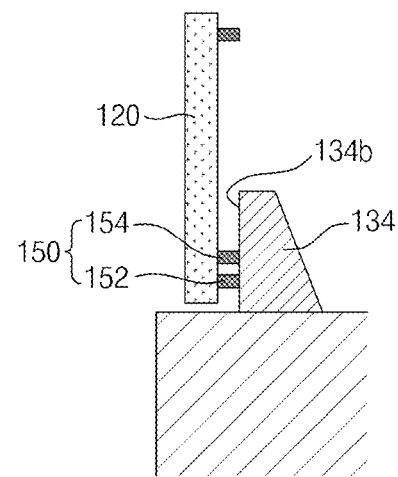
FIG. 5 and FIG. 6 are views for explaining a sealing portion of the air control valve for a fuel cell according to the exemplary embodiment of the present invention.
Figure 6:
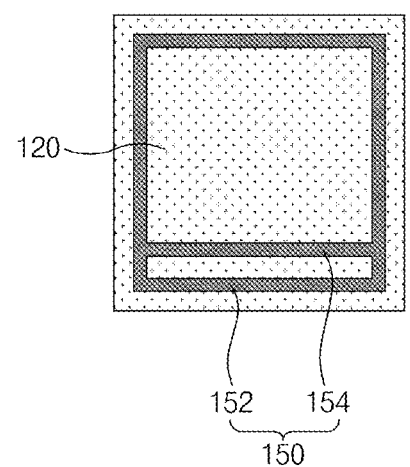

For example, referring to FIG. 5 and FIG. 6, the sealing portion 150 may include a first sealing member 152 disposed on the internal surface of the valve member 120 and configured to come into contact with the seating portion 134b.

For example, the first sealing member 152 may be provided in a form of an approximately quadrangular ring provided along the edge portion of the internal surface of the valve member 120.

The first sealing member 152 may be made of an elastic material such as rubber, silicone, or urethane. The present invention is not restricted or limited by the material and properties of the first sealing member 152.

The sealing portion 150 may include a second sealing member 154 disposed on the valve member 120, spaced from the first sealing member 152, and configured to come into contact with the seating portion 134b.

For example, the second sealing member 154 may be disposed at a lower end portion of the internal surface of the valve member 120 and have an approximately straight shape.

The second sealing member 154 may be made of an elastic material such as rubber, silicone, or urethane. The present invention is not restricted or limited by the material and properties of the second sealing member 154.

The first and second sealing members 152 and 154 may be manufactured separately from the valve member 120 and then attached (bonded) to the internal surface of the valve member 120. According to various exemplary embodiments of the present invention, the first and second sealing members may be provided on the internal surface of the valve member by applying or printing an elastic material. Alternatively, the first and second sealing members may be provided on the valve member by injection molding.

For reference, in the exemplary embodiment of the present invention, the example has been described in which the second sealing member 154 is partially provided at the lower end portion of the internal surface of the valve member 120. However, according to various exemplary embodiments of the present invention, like the first sealing member, the second sealing member may be provided in a form of a ring provided along the edge portion of the internal surface of the valve member.

As described above, according to the exemplary embodiment of the present invention, the gap between the valve member 120 and the seating portion 134b (the gap between the air flow path and the valve member) may be sealed by the dual sealing structure including the first sealing member 152 and the second sealing member 154 in the state in which the valve member 120 is accommodated on the seating portion 134b. Therefore, it is possible to obtain an advantageous effect of improving the sealing performance implemented by the valve member 120 and minimizing the leakage of air through the gap between the valve member 120 and the seating portion 134b.

In the exemplary embodiment of the present invention illustrated and described above, the example has been described in which both the first sealing member 152 and the second sealing member 154 are provided on the internal surface of the valve member 120. However, according to various exemplary embodiments of the present invention, any one of the first sealing member and the second sealing member may be provided on the internal surface of the valve member, and the other of the first sealing member and the second sealing member may be provided on the seating portion.

Figure 7:
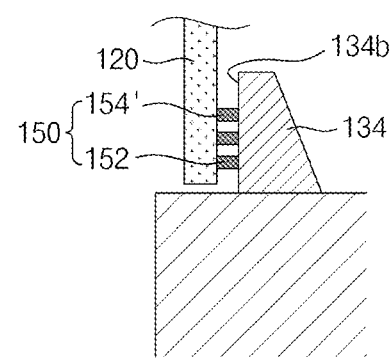
FIG. 7, FIG. 8 and FIG. 9 are views for explaining modified examples of the sealing portion of the air control valve for a fuel cell according to the exemplary embodiment of the present invention.
Figure 8:
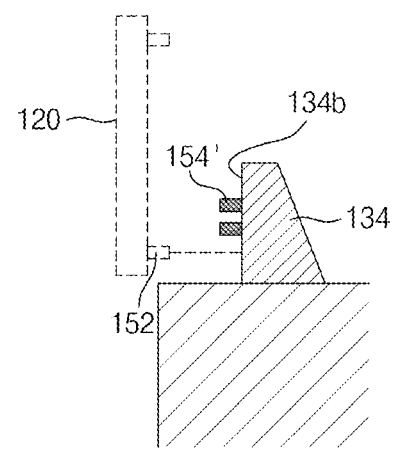
Figure 9:
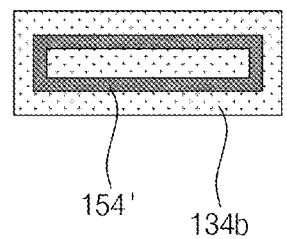

That is, referring to FIGS. 7 to 9, according to various exemplary embodiments of the present invention, the air control valve 100 for a fuel cell may include the sealing portion 150 configured to seal the gap between the air flow path 112 and the valve member 120. The sealing portion 150 may include the first sealing member 152 disposed on the internal surface of the valve member 120 and configured to come into contact with the seating portion 134*b*, and a second sealing member 154' disposed on the seating portion 134*b* and configured to come into contact with the internal surface of the valve member 120.

For example, the first sealing member 152 may be provided in a form of an approximately quadrangular ring provided along the edge portion of the internal surface of the valve member 120.

The second sealing member 154' may have various structures configured for cooperatively defining a sealing wall together with the first sealing member 152. The present invention is not restricted or limited by the shape and structure of the second sealing member 154'.

For example, the second sealing member 154' may be provided in a form of a closed loop (e.g., a quadrangular ring) and accommodated in the first sealing member 152.

Since the second sealing member 154' provided in a form of a closed loop is disposed in the first sealing member 152 as described above, the gap between the valve member 120 and the seating portion 134*b* may be sealed by the triple sealing structure. Therefore, it is possible to obtain an advantageous effect of further improving the sealing performance implemented by the valve member 120 and more effectively inhibiting the leakage of air through the gap between the valve member 120 and the seating portion 134*b*.

According to various exemplary embodiments of the present invention, the second sealing member disposed on the seating portion may be provided in a form of an open loop such as a straight shape or an arc shape.

According to the exemplary embodiment of the present invention, the air control valve 100 for a fuel cell may include a through-hole 136 provided in the trapping wall 134. One end portion of the through-hole 136 may be exposed to an internal surface of the trapping wall 134 (a right surface of the trapping wall based on FIG. 10), and the other end portion of the through-hole 136 may be exposed to an external surface of the trapping wall 134 (a left surface of the trapping wall based on FIG. 10).

The through-hole 136 may be inclined downwardly from the external surface of the trapping wall 134 toward the internal surface of the trapping wall 134. According to various exemplary embodiments of the present invention, the through-hole may be horizontally provided in the trapping wall.

Figure 10:
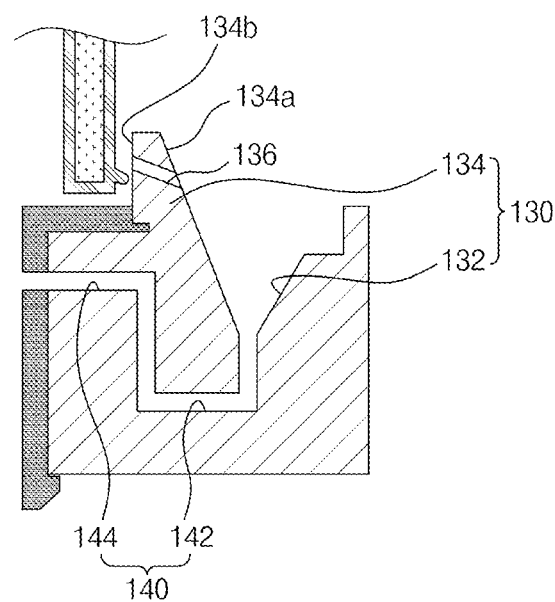
FIG. 10 is a view for explaining a through-hole in the air control valve for a fuel cell according to the exemplary embodiment of the present invention.

To ensure the sealing performance of the sealing portion 150, the other end portion of the through-hole 136 may be disposed inside the sealing portion 150 (on an upper portion of the sealing portion based on FIG. 10). In some instances, the through-hole may be provided at the same height as the sealing portion.

As described above, according to the exemplary embodiment of the present invention, since the through-hole 136 is provided in the trapping wall 134, foreign substances (condensate water or corroded substances) accumulated between the valve member 120 and the external surface of the trapping wall 134 (the left surface of the trapping wall based on FIG. 10) may be trapped in the trapping hole 132. Therefore, it is possible to obtain an advantageous effect of further improving the efficiency in trapping the foreign substances. Furthermore, it is possible to minimize the accumulation of the foreign substances between the valve member 120 and the valve housing 110 and effectively remove the foreign substances accumulated between the valve member 120 and the valve housing 110.

Moreover, according to the exemplary embodiment of the present invention, since the through-hole 136 is provided in the trapping wall 134, an additional flow path may be ensured to allow the air, which is blocked by the trapping wall 134, to flow at the time of discharging the air. Therefore, it is possible to obtain an advantageous effect of improving the efficiency in discharging the air.

According to the exemplary embodiment of the present invention described above, it is possible to obtain an advantageous effect of minimizing the accumulation of foreign substances at the periphery of the valve member and improving stability and reliability.

According to the exemplary embodiment of the present invention, it is possible to obtain an advantageous effect of minimizing the accumulation of foreign substances at the periphery of the valve member and minimizing disability of the valve member caused by frozen foreign substances.

Furthermore, according to the exemplary embodiment of the present invention, it is possible to obtain an advantageous effect of improving stability and reliability.

Furthermore, according to the exemplary embodiment of the present invention, it is possible to obtain an advantageous effect of improving the performance (operational stability) in opening or closing the valve member and improving the sealing performance.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An air control valve apparatus for a fuel cell, which controls air that flows into or out of a fuel cell stack, the air control valve apparatus comprising:
   a valve housing having an air flow path fluidically-communicating with the fuel cell stack;
   a valve member configured to selectively open or close the air flow path;

a trapping portion provided in the valve housing, disposed adjacent to an internal surface of the valve member, and configured to trap foreign substances discharged from the fuel cell stack; and a siphon guide tube connected between the trapping portion and the outside of the valve member and configured to selectively discharge the foreign substances trapped by the trapping portion to the outside of the valve member through the siphon guide tube.

2. The air control valve apparatus of claim 1, wherein the trapping portion includes:

a trapping hole provided in the valve housing and disposed adjacent to the internal surface of the valve member; and a trapping wall disposed between the valve member and the trapping hole to guide the foreign substances to the trapping hole.

3. The air control valve apparatus of claim 2, further including:

an inclined guide portion provided on an internal surface of the trapping wall and configured to guide the foreign substances to the trapping hole.

4. The air control valve apparatus of claim 3, further including:

a through-hole provided in the trapping wall, wherein a first end portion of the through-hole is exposed to an internal surface of the trapping wall, and a second end portion of the through-hole is exposed to an external surface of the trapping wall, wherein the inclined guide portion includes:

a front inclined guide portion inclined downwardly from the trapping wall toward the trapping hole in a rearward direction; and a rear inclined guide portion inclined downwardly from the trapping wall toward the trapping hole in a forward direction, wherein a height of the rear inclined guide portion is lower than a height of the front inclined guide portion, and wherein a first end portion of the through-hole is exposed to an internal surface of the front inclined guide portion, and a second end portion of the through-hole is exposed to an external surface of the trapping wall.

5. The air control valve apparatus of claim 2, further including:

a seating portion provided on an external surface of the trapping wall, wherein the valve member is selectively seated on the seating portion.

6. The air control valve apparatus of claim 5, further including:

a sealing portion configured to seal a gap between the air flow path and the valve member.

7. The air control valve apparatus of claim 6, wherein the sealing portion includes a first sealing member disposed on the valve member and configured to come into contact with the seating portion.

8. The air control valve apparatus of claim 7, further including:

a second sealing member disposed on the valve member, spaced from the first sealing member, and configured to come into contact with the seating portion.

9. The air control valve apparatus of claim 7, wherein the sealing portion includes a second sealing member disposed on the seating portion and configured to come into contact with the internal surface of the valve member.

10. The air control valve apparatus of claim 9, wherein the second sealing member is provided in a form of a closed loop and accommodated in the first sealing member.

11. The air control valve apparatus of claim 2, wherein an inlet of the trapping hole has a first cross-sectional area, and an outlet of the siphon guide tube has a second cross-sectional area smaller than the first cross-sectional area.

12. The air control valve apparatus of claim 11, wherein a ratio of the first cross-sectional area to the second cross-sectional area is 5:4.

13. The air control valve apparatus of claim 2, wherein the trapping hole has a cross-sectional area that decreases from an inlet of the trapping hole toward an outlet of the trapping hole.

14. The air control valve apparatus of claim 2, wherein the siphon guide tube includes:

a trapping tube connected to an outlet of the trapping hole to receive the foreign substances therein; and a discharge tube having a first end portion connected to the trapping tube and a second end portion externally exposed of the valve member.

15. The air control valve apparatus of claim 14, wherein the discharge tube is positioned higher than the trapping tube.

16. The air control valve apparatus of claim 14, wherein the discharge tube is positioned higher than the outlet of the trapping hole.

17. The air control valve apparatus of claim 14, wherein the trapping tube has a 'U'-shaped cross-section.

18. The air control valve apparatus of claim 2, further including:

a through-hole provided in the trapping wall, wherein a first end portion of the through-hole is exposed to an internal surface of the trapping wall, and a second end portion of the through-hole is exposed to an external surface of the trapping wall.

19. The air control valve apparatus of claim 18, wherein the through-hole is inclined downwardly from the external surface of the trapping wall toward the internal surface of the trapping wall.

20. The air control valve apparatus of claim 18, further including:

a sealing portion configured to seal a gap between the air flow path and the valve member, wherein the second end portion of the through-hole is disposed on an upper portion of the sealing portion.

* * * * *